Nov. 19, 1963 G. H. OVERFIELD 3,111,023
TEMPERATURE CONTROL OF A THERMOCHROMATOGRAPHIC COLUMN
Filed July 1, 1960 2 Sheets-Sheet 1
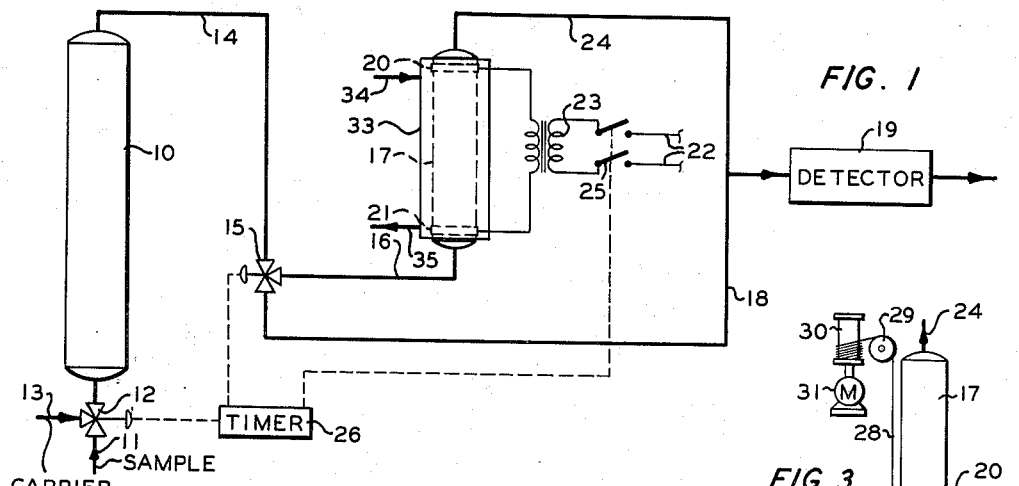
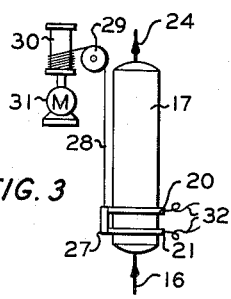
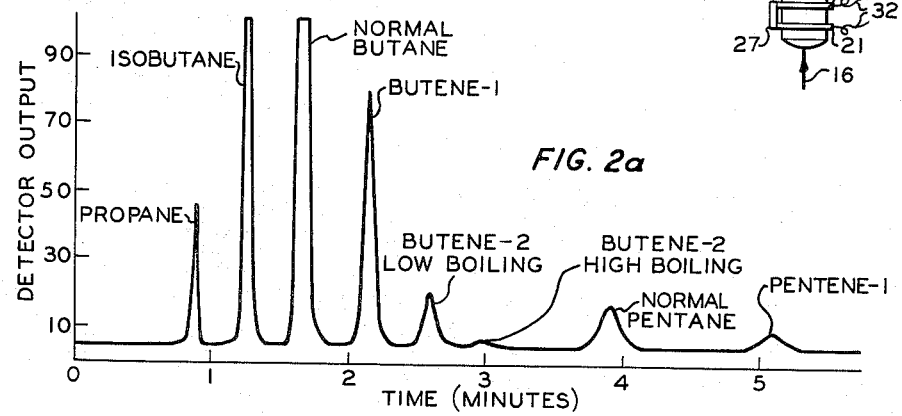
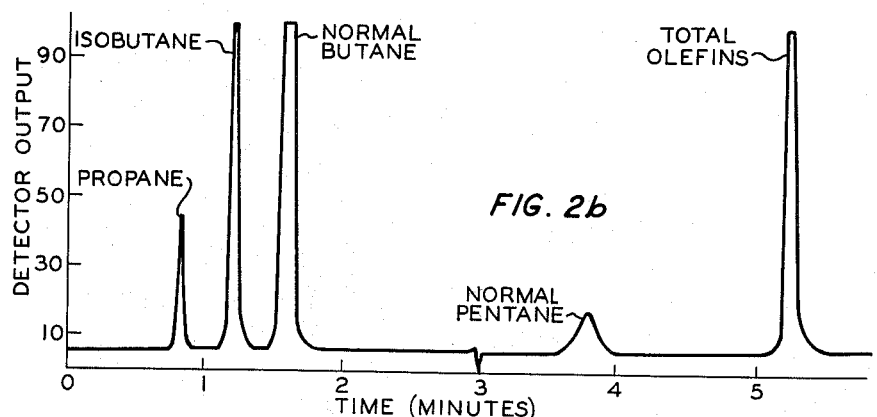
INVENTOR.
G. H. OVERFIELD
BY
*Hudson & Young*
ATTORNEYS Nov. 19, 1963 G. H. OVERFIELD 3,111,023
TEMPERATURE CONTROL OF A THERMOCHROMATOGRAPHIC COLUMN
Filed July 1, 1960 2 Sheets-Sheet 2

INVENTOR.
G.H. OVERFIELD
BY
*Hudson & Young*
ATTORNEYS

United States Patent Office 3,111,023
Patented Nov. 19, 1963

3,111,023
TEMPERATURE CONTROL OF A THERMO-CHROMATOGRAPHIC COLUMN
Gerald H. Overfield, Bartlesville, Okla., assignor to Phillips Petroleum Company, a corporation of Delaware
Filed July 1, 1960, Ser. No. 40,339
2 Claims. (Cl. 73—23)

This invention relates to a method of heating and cooling a thermochromatographic column.

There is a need for analytical procedures capable of measuring small concentrations of fluid streams for industrial and laboratory operations. One method of analyzing such streams involves the use of a chromatographic analyzer. In chromatography, a sample of the material to be analyzed is introduced into a column containing a selective sorbent or partitioning material. A carrier gas is directed into the column so as to force the sample material therethrough. The selective sorbent or the partitioning material attempts to hold the constituents of the mixture. This results in the several constituents of the fluid mixture flowing through the column at different rates of speed, depending upon their affinity for the packing material. The column effluent thus consists initially of a carrier gas alone, the individual constituents of the fluid mixture appearing later at spaced time intervals. The conventional method of detecting these constituents is to employ a thermal conductivity detector which compares the thermal conductivity of the effluent gas with the thermal conductivity of the carrier gas directed to the column.

Chromatographic analyzers of the type described have proven to be quite useful. However, it is difficult to detect small concentrations of constituents and to determine with a high degree of accuracy the exact concentration of various constituents present. It has been found that the addition of a thermochromatographic column to the elution or partition type chromatographic analyzer in many cases vastly improves the efficiency of the analyzing process.

By means of a suitable valving system, a portion of the effluent from an elution or partition column containing a trace constituent is passed to a thermochromatographic column, whereby heating and cooling the column rapidly the trace component is concentrated in a relatively small portion of the carrier gas. Thermochromatographic columns also can be used to sum peaks, improve peak resolution, and store peaks. It is well known in the art that a peak is the graphical illustration of the concentration of a constituent or constituents. By summing peaks, the concentration of consecutive fractional constituents of a sample may be shown as one peak thus enabling the exact concentration of the sum of the two constituents to be more accurately determined. By proper valving, a thermochromatographic column may be put into and taken out of a sample flow stream in a manner to store, for example, all of the olefin peaks present in the sample.

The use of a thermochromatographic column as previously described is limited by the success or failure of the method employed to heat and cool the column. In each case it is desired to rapidly heat the column containing the trace constituent, or constituents so as to drive the trace constituent, summed peaks, and stored peaks from the column as quickly as possible and then to rapidly cool the column in preparation for the next cycle.

An object of this invention is to provide an improved apparatus for the heating of a thermochromatographic column.

Another object of this invention is to provide an improved apparatus for the cooling of a thermochromatographic column.

Other objects, advantages and features of the invention should become apparent from the following detailed description and appended claims.

I have discovered a direct method of heating a thermochromatographic column by attaching electrodes to said column constructed of an electrically conductive material having low electrical conductivity. When current is applied, the portion of the column between the electrodes becomes heated. I have further discovered an improved method of controlling the temperature of the thermochromatographic column by an inventive arrangement of the column, column heater, and column cooling means.

FIGURE 1 is a schematic representation of an analyzing process employing the invention.

FIGURES 2a and 2b are graphical representations of the effectiveness of the invention.

FIGURE 3 is a schematic diagram of a method of moving the heating electrodes along a thermochromatographic column.

Figure 4:
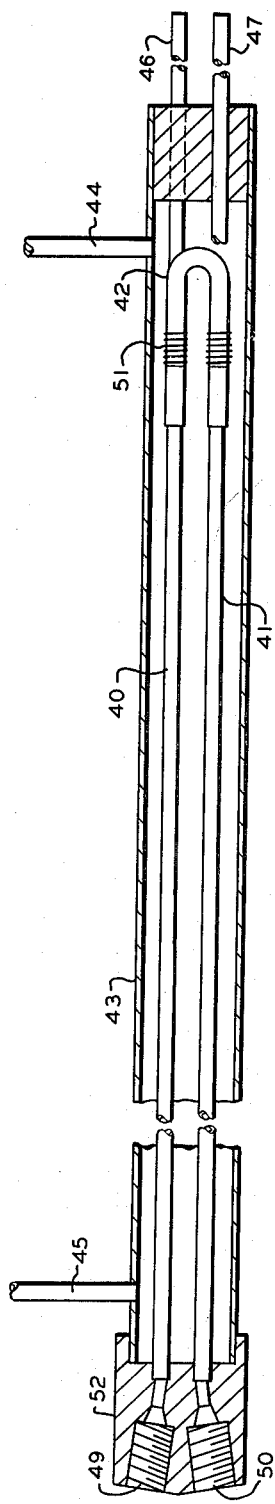
FIGURE 4 is a cross-sectional view of a thermochromatographic column illustrating an embodiment of the inventive method of controlling the temperature of said column.

Referring now to the drawings and to FIGURE 1 in particular, column 10 is filled with a packing material that selectively retards the passage of the constituents of the fluid mixture to be analyzed. A fluid sample to be analyzed is introduced into the inlet of column 10 as a vapor by means of a conduit 11 through a three-way control valve 12. Carrier gas is introduced into column 10 by means of a conduit 13 through three-way control valve 12. The effluent from column 10 is removed through conduit 14 which communicates with the inlet of a three-way control valve 15. The first outlet of control 15 is connected by conduit 16 to a thermochromatographic column 17. The second outlet of control valve 15 is connected by a conduit 18 to a detector 19.

Column 17 is a low electrical conductive column filled with material which selectively retards the passage therethrough of the constituents in the fluid mixture to be analyzed. Examples of suitable materials that may be used in the fabrication of the thermochromatographic column are stainless steel, nichrome, iron, nickel and silicon carbide. Column 17 is provided with electrodes 20 and 21 attached directly to the column. The source 22 of electrical energy can be a high voltage current transformed by means of a transformer 23 to a low voltage current. Column 17 is provided with a cooling jacket 33. A cooling medium, such as air, is introduced into said jacket by means of a conduit 34 and removed by means of a conduit 35. The effluent from column 17 is passed through a conduit 24 to a detector 19.

The detector 19 can be a thermal conductivity detector which includes a temperature sensitive resistant element placed in the path of flow. A reference element, not shown, can be placed in the carrier gas flow. Such detector provides signals representative of the difference in thermoconductivity between the column effluent and the carrier gas. The temperature differences between the resistance elements can be measured by electrical bridge circuits, such as a Wheatstone bridge, for example.

Control valves 12, 15, and control switch 25 are operated by a timer 26. It is, of course, to be understood that timer 26 would also operate a valve controlling the flow of the cooling medium in conduit 34, not herein shown. This timer provides output signals that operate the valves and the switch in the sequence described hereinafter. This timer can be any type of apparatus known in the art for providing control signals in the desired sequence. A common type of timer utilizes a series of cam operated switches wherein the associated cams are rotated by a timing motor.

It is to be understood that it is within the scope of this invention to form the electrodes in the shape of movable rings, providing means of moving said rings along the column and resistant heating the portion of the column between said electrodes.

FIGURE 3 illustrates a method of moving electrode rings 20 and 21, supported by an insulated bracket 27, along column 17 by a cable 28. Rotation of a drum 30 by a motor 31 moves the cable 28 around the guide wheel 29 to the drum 30. In this manner the heating electrodes can be moved from the inlet to the outlet of the thermochromatographic column with said electrodes remaining in constant electrical contact with said column. Other suitable means of moving the electrodes can be employed within the scope of this invention. A sample is introduced to column 17 by a conduit 16 and is passed from the column 17 by a conduit 24. A low voltage current is supplied to electrodes 20 and 21 by lead wires 32.

Figure 5:
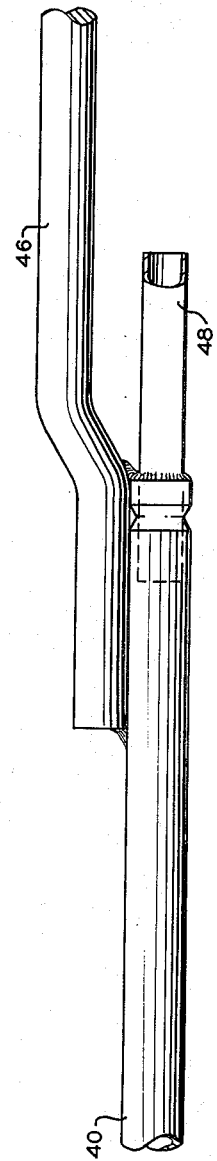
FIGURE 5 illustrates a method of attaching the heating electrodes to the column of FIGURE 4.

Referring to FIGURE 4, thermochromatographic sections 40 and 41 form a single column by being joined with a U-shaped connecting member 42. Connecting member 42 is fabricated from an electrical insulating material. Thermochromatographic sections 40 and 41 are fabricated from material of low electrical conductivity as previously described. A jacket 43 surrounds the thermochromatographic column and a cooling medium is introduced to jacket 43 by means of a conduit 44 and removed by means of a conduit 45. Electrodes 46 and 47 are attached directly to sections 40 and 41, respectively. A preferred means of attaching said electrodes is illustrated by FIGURE 5 wherein a copper electrode 46 is silver brazed to section 40. Linking member 48 of FIGURE 5 provides a means of attaching U-shaped connecting member 42 to said section 40. The thermochromatographic column of FIGURE 4 is filled with a packing material that selectively retards passage therethrough of the constituents of the fluid mixture to be analyzed. Sample is transmitted to the column by means of a conduit inlet 49 and withdrawn by means of a conduit outlet 50. U-shaped connecting member 42 can be held in place by means of a coral spring clamp 51, or other suitable means. To complete the electrical resistant circuit between sections 40 and 41, end member 52 is fabricated from the same material used in fabricating thermochromatographic sections 40 and 41.

In order to describe the operation of the invention, reference is made to a specific peak storing operation in the analysis of a hydrocarbon mixture using the inventive embodiment illustrated in FIGURE 1. Column 10 was formed of 10 feet of ⅛ inch stainless steel tubing containing firebrick. The firebrick had been soaked in an ether compound. Column 17 was formed of 6 inches of 3/16 inch stainless steel tubing having a wall thickness of 0.005 inch and containing silica-gel. Helium was employed as a carrier gas and was supplied by conduit 13 to column 10 at a rate of 37 cc./min. The volume of sample mixture supplied to the column 10 was 0.5 cc. The current supplied through electrodes 20 and 21 was measured at 30 amps. at 1.9 volts.

FIGURE 2a illustrates the output signal of the detector 19 when the thermochromatographic column 17 was by-passed for the entire analyzing operation. The detector employed was a thermal conductivity cell. FIGURE 2b illustrates the use of the invention. The thermochromatographic column 17 was by-passed for the first minute and fifty seconds after the sample was introduced to column 10. The thermochromatographic column 17 was then switched into the sample flow stream and switched out after an additional minute and five seconds (total time of two minutes, fifty-five seconds). Column 17 was again switched into the sample flow stream after an additional minute and 30 seconds (total time of 4 minutes, 25 seconds) and out again after 30 seconds (total time of 4 minutes, 55 seconds). At this time heat was applied to column 17 by the inventive method for a period of 8 seconds. Column 17 was then cooled rapidly in preparation for the next cycle by using an air blower, not herein shown, to pass air through the jacket 33.

It can readily be seen from FIGURES 2a and 2b that the individual peaks representing the olefin concentration of the feed sample have been combined and are now represented by one peak. The concentration of olefins in a single peak is possible because of the use of the invention to rapidly heat and cool the thermochromatographic column in the manner described.

The advantages of the invention must include the low cost of the necessary heating and cooling equipment and the simplicity of installation. In addition thereto, less electrical power is required for heating the column as the method of heating is direct. An advantage of the embodiment illustrated in FIGURE 4 is at once apparent when it is considered that a normally long thermochromatographic column may be heated and cooled with maximum efficiency by reducing the heat lost during the heating cycle and reducing the heat gain by the cooling medium from the surroundings during the cooling cycle. Obviously, by thus reducing the length of the jacketed column, a more efficient heat exchange means is presented and thereby better temperature control of a thermochromatographic column is effected.

As will be evident to those skilled in the art, various modifications of this invention can be made, or followed, in light of the foregoing disclosure and discussion, without departing from the spirit or scope thereof.

I claim:

1. A thermochromatographic column comprising a U-shaped vessel containing a material that selectively retards passage therethrough of the constituents of the fluid mixture to be analyzed, said vessel formed from two straight sections of tubing fabricated from an electrically conducting material having low electrical conductivity and joined by means of electrically insulated U-shaped tubing; a first vessel conduit inlet means; a second vessel conduit outlet means; a heater consisting of two electrodes operatively attached to said sections adjacent said U-shaped tubing; an electrically conducting contact means having low electrical conductivity communicating between the walls of said sections adjacent said inlet and said outlet means of said vessel; a jacket surrounding said vessel; a third conduit inlet means for introducing a cooling medium to said jacket; a fourth conduit outlet means for removing said cooling medium from said jacket; and means of conducting current to said electrodes.

2. Apparatus for analyzing fluid mixture comprising first and second columns, each containing a material which selectively retards passage therethrough of the constituents of the fluid mixture to be analyzed, said second column comprising a U-shaped vessel formed from two straight sections of tubing fabricated from an electrically conducting material having low electrical conductivity and joined by means of electrically insulated U-shaped tubing; first conduit means communicating with the inlet of said first column to introduce a carrier gas; second conduit means communicating with the inlet of said first column to introduce a fluid mixture to be analyzed; third conduit means communicating between the outlet of said first column and the inlet of said second column; fourth conduit by-pass means communicating with said third conduit means and a means to measure a property of the effluent from said first column which is representative of the composition thereof; valve means for controlling fluid flow through said third conduit means downstream of said communication between said third and fourth conduit means and through said fourth conduit means; fifth conduit means communicating between the outlet of said second column and a means to measure a property of the effluent from said second column which is representative of the composition thereof; a heater comprising two electrodes operably attached to said straight sections adjacent said electrically insulated U-shaped tubing; an electrically conducting contact means having low electrical conductivity communicating between the walls of said sections adjacent said inlet and said outlet means of said second column; a jacket surrounding said second column; means for passing a cooling medium through said jacket; and a means for conducting current to said electrodes.

References Cited in the file of this patent
UNITED STATES PATENTS 2,991,647    Harris _____ July 11, 1961

FOREIGN PATENTS 275,586    Germany _____ June 23, 1914
123,512    Australia _____ Feb. 6, 1947

OTHER REFERENCES

Gas Chromatography, by D. H. Desty, published in London by Butterworths Scientific Publications, pp. 216–225.

Analytical Chemistry I, "Gas Chromatography," article by M. Dimbat et al., vol 28, No. 3, March 1956, page 290.

Analytical Chemistry II, "Two Stage Gas-Lliquid Chromatography," article by M. C. Simmons et al., vol. 30, No. 1, January 1958, page 32.